Dec. 15, 1931. J. A. REECE 1,836,394
PROCESS AND APPARATUS FOR PRODUCING SHEET GLASS
Filed Sept. 22, 1927
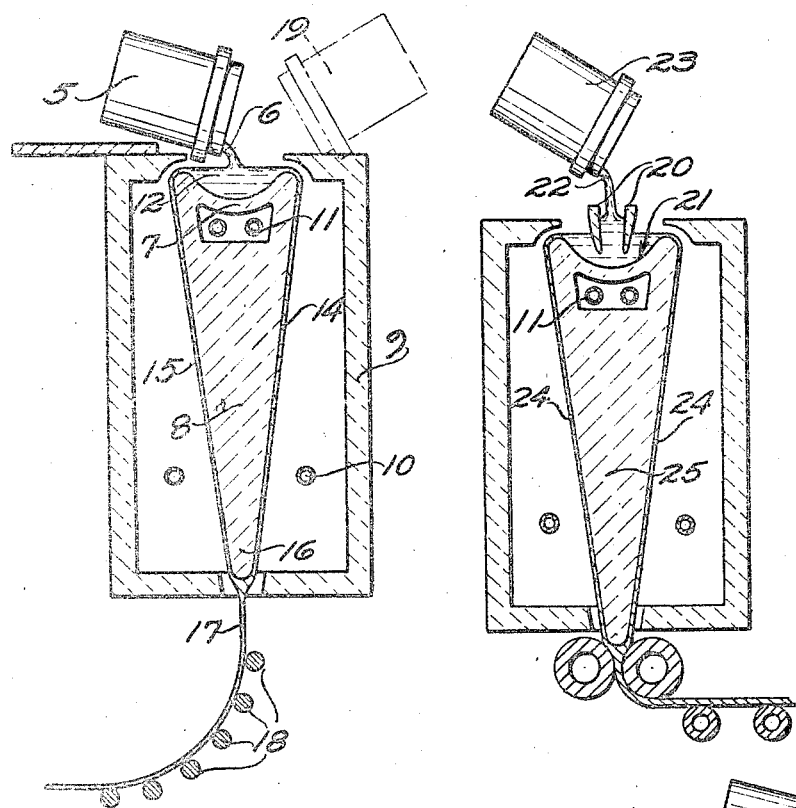
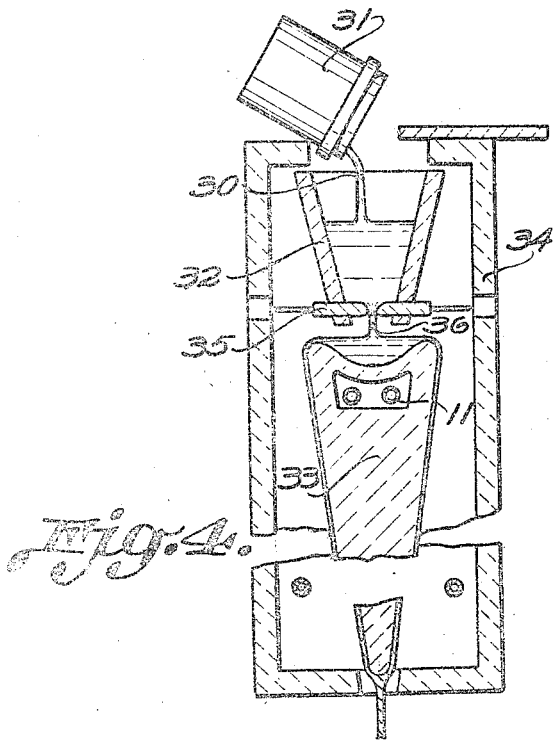
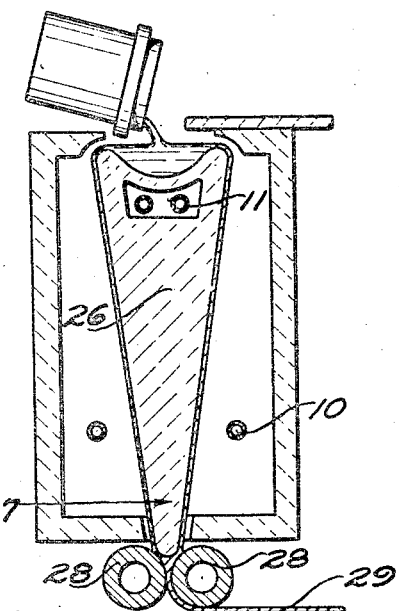
Inventor
Joseph A. Reece
By Frank Fraser
Attorney Patented Dec. 15, 1931

1,836,394

UNITED STATES PATENT OFFICE

JOSEPH A. REECE, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR PRODUCING SHEET GLASS

Application filed September 22, 1927. Serial No. 221,186.

The present invention relates to a process and apparatus for producing sheet glass.

An important object of the invention is to provide in sheet glass apparatus, means whereby a stream of pot glass may be divided into a plurality of films of glass, which films are flowed along suitable surfaces and then united to create a single sheet.

Another object of the invention is to provide a process and apparatus whereby a mass of molten glass is created and refined in a pot and then transferred from the pot to a sheet forming slab which separates the mass of glass into two films which flow down opposite sides of the slab, the films uniting at the end of said slab to form a single sheet of glass.

A still further object of the invention is to provide a process and apparatus wherein molten glass is produced in pots, which glass is refined while in a substantially quiescent state, after which it is transferred to a receptacle formed in the upper end of a sheet forming slab, the glass overflowing the sides of the receptacle and flowing down the opposite sides of said slab and merging at the lower end thereof to form a single sheet of glass, the receptacle being replenished from first one pot of glass and then another so that if it is desired a continuous sheet may be formed in this manner from pot glass.

Other objects and advantages of the invention will become more apparent during the course of the following description when taken in connection with the accompanying drawings.

In the drawings wherein like numerals are employed to designate like parts throughout the same, Fig. 1 is a vertical longitudinal section through a portion of a sheet glass forming apparatus, Fig. 2 is a similar view of another form, and Figs. 3 and 4 are fragmentary sectional views illustrating slightly different forms of the invention.

The present invention relates particularly to a means designed to permit the formation of a sheet of glass from so-called "pot glass".

The term "pot glass" is used to designate glass which is created and refined in a pot. The glass, being formed and completely refined while in a quiescent state, is of high quality due to the fact that bubbles and the like are permitted to escape and settle so that the resultant mass will be, practically speaking, free from such bubbles. If bubbles are allowed to remain in the molten glass they find their way into the finished product, producing what is known as seeds and blisters which obviously affect the value of the commercial article.

In accordance with the present invention, molten glass is created and completely refined in pots. Sufficient time is allowed to permit the proper refining of the glass so that a source of glass, practically free from the ordinary glass defects, is produced. The numeral 5 designates one of a series of pots which may be used, and the production of glass in such pots will be understood by those familiar with the art. Briefly speaking, however, the pots are arranged in a suitable furnace and the raw batch ingredients are introduced therein where they are subjected to the temperature within the furnace. After the initial fill of batch has melted, additional batch is added until a potful of glass has been formed. The temperature of the furnace is then controlled to allow refining of the molten glass within each pot.

As shown in Fig. 1, the pot 5 is being tilted to allow the molten glass 6 to flow into the receptacle 7 formed in the upper end of the slab 8. The slab 8 is preferably mounted in a suitable compartment 9, the temperature of which may be controlled by means of the burners or the like 10. Temperature control means 11 may also be arranged within the slab as shown in Fig. 1 whereby to control or to assist in controlling the temperature of the glass 12 arranged in the receptacle designated by the numeral 7. The molten glass is poured into the receptacle 7 and is caused to overflow the sides of said receptacle whereby the films 14 and 15 will be allowed to move down the opposite converging sides of the slab 8. The films 14 and 15 unite at the lower end 16 of the slab to form a single sheet 17 which may be deflected into a horizontal plane by means of the rolls 18 arranged as shown. Obviously, the sheet 17 may be conveyed downwardly in a vertical plane and annealed in such plane if desired. The process is preferably made continuous by pouring first one potful of glass and then another into the receptacle 7, and to accomplish this a second receptacle 19 is used, the receptacle 19 being shown in dotted lines. Thus the pot 5 is first emptied, and as it becomes empty the pot 19 is moved into operative position and glass supplied to the receptacle 7 from the pot 19. In the meantime, the pot 5 which is empty is removed and another pot brought into position and made ready for emptying as soon as the pot 19 has been emptied. This process may be continued as long as desired.

In Fig. 2, means 20 are associated with the receptacle 21 so that the glass 22 flowing from the pot 23 will flow between the slabs or members 20 in a manner to prevent waves being formed in the films 24 flowing down the sides of the slab 25. Thus, although the supply of glass 22 may be varying in its nature and in fact intermittently supplied, the glass overflowing the sides of the receptacle 21 will move substantially uniformly at all times so that an accurate control of the films 24 can be had, and thus the resultant thickness of sheet produced will likewise be uniform.

In Fig. 3 the suppply of glass to the slab 26 is the same as that shown in Figs. 1 or 2, but the glass uniting at the end 27 of the slab is passed between a pair of rolls 28 arranged to create a sheet forming pass whereby the molten glass is rolled into a sheet 29 having a predetermined thickness. The construction shown in Fig. 3 is particularly well adapted for the production of plate glass blanks, which blanks are, subsequent to their formation, ground and polished. In Fig. 1, it will be seen that the outer surfaces of the sheet do not contact with anything but heated atmosphere until the sheet has become substantially set, thus the surfaces will have a good fire finish. The sheet thus formed is well adapted for window glass uses, although of course it may be surfaced if desired.

In Fig. 4 is shown an arrangement wherein the molten glass 30 issuing from the pot 31 is received in a receptacle 32 before it passes onto the slab 33. The receptacle 32 is preferably arranged in a heated compartment 34 and is provided with an adjustable bottom 35 which controls the flow 36 passing from said receptacle to the slab 33.

A sheet of glass formed in accordance with the above invention will be of exceptional quality because the molten source, from which the sheet is produced, is properly refined and conditioned before being used. The size and therefore the capacity of the pots 5 can be varied as desired, as can also the size and shape of the slab 8 in Fig. 1 or the corresponding slabs in the other figure. The thickness of the film flowing down the sides of the slab can be controlled by proper temperature treatment of the glass and also by the speed at which the glass is poured from the pots into the receptacle 7. The speed at which the sheet is drawn will also determine the thickness of the films and the finished sheet.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. The process of producing sheet glass, consisting in completely melting and refining molten glass in a series of separate containers while maintained in a substantially quiescent state, flowing the molten glass intermittently from the several containers into the recessed top of a substantially vertically positioned slab, guiding the molten glass from the lower portion of the recess up, over and down the converging sides of the slab, and in continuously drawing away the converging flows in single sheet form.

2. The process of producing sheet glass, consisting in completely melting and refining molten glass in a series of separate containers while maintained in a substantially quiescent state, flowing the molten glass intermittently from the several containers centrally into the recessed top of a substantially vertically positioned slab, dividing this downflow of glass at the bottom of the recess into two equal upflows, each of which spills over and flows down one of the opposite converging sides of the slab, and then continuously drawing away these two meeting flows in single sheet form.

Signed at Toledo, in the county of Lucas and State of Ohio, this 20th day of September, 1927.

JOSEPH A. REECE.